(12) United States Patent
Mochizuki

(10) Patent No.: US 9,760,334 B2
(45) Date of Patent: Sep. 12, 2017

(54) ELECTRONIC SHELF LABEL SYSTEM, ELECTRONIC SHELF LABEL TERMINAL, ELECTRONIC SHELF LABEL SERVER AND CONTROL METHOD FOR THE SAME

(71) Applicant: TOSHIBA TEC KABUSHIKI KAISHA, Shinagawa-ku, Tokyo (JP)

(72) Inventor: Hiroki Mochizuki, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 14/590,193

(22) Filed: Jan. 6, 2015

(65) Prior Publication Data

US 2015/0199942 A1     Jul. 16, 2015

(30) Foreign Application Priority Data

Jan. 16, 2014  (JP) .................. 2014-006184

(51) Int. Cl.
G06F 3/14       (2006.01)
G06F 3/147      (2006.01)

(52) U.S. Cl.
CPC ............ G06F 3/1431 (2013.01); G06F 3/147 (2013.01); *G09G 2330/021* (2013.01); *G09G 2360/04* (2013.01); *G09G 2370/16* (2013.01); *G09G 2380/04* (2013.01)

(58) Field of Classification Search
None
See application file for complete search history.

(56) References Cited

U.S. PATENT DOCUMENTS

| | | | | |
|---|---|---|---|---|
| 2003/0233280 A1* | 12/2003 | Haulk | ................ | G06Q 30/06 705/22 |
| 2005/0174302 A1* | 8/2005 | Ishii | ................ | G06F 3/1423 345/30 |
| 2010/0050488 A1* | 3/2010 | Krans | ................ | A41D 27/085 40/541 |

FOREIGN PATENT DOCUMENTS

JP         2008-123046         5/2008

* cited by examiner

*Primary Examiner* — Kee M Tung
*Assistant Examiner* — Xin Sheng
(74) *Attorney, Agent, or Firm* — Amin, Turocy & Watson LLP

(57) ABSTRACT

Each electronic shelf label terminal includes a display section, a first image storage section in which a first image containing the price of a commodity displayed on the commodity shelf equipped with the electronic shelf label terminal is stored, a second image storage section in which a second image consisting of n parts simultaneously displayed on each display section of n electronic shelf label terminals arranged in one direction is stored, and a control section configured to repeatedly carry out a control to continuously display the second image stored in the second image storage section for a time which is n times greater than the display time of the first image at a predetermined interval after displaying the first image stored in the first image storage section for a time at a predetermined interval on the display section.

7 Claims, 12 Drawing Sheets

| T | SHELF LABEL 13a | SHELF LABEL 13b | SHELF LABEL 13c |
|---|---|---|---|
| 1 | D1 | D2 | D2 |
| 2 | D2 | D1 | D2 |
| 3 | D2 | D2 | D1 |
| 4 | D2 | D2 | D2 |
| 5 | D1 | D2 | D2 |
| 6 | D2 | D1 | D2 |
| 7 | D2 | D2 | D1 |
| 8 | D2 | D2 | D2 |
| 9 | D1 | D2 | D2 |
| 10 | D2 | D1 | D2 |
| 11 | D2 | D2 | D1 |
| 12 | D2 | D2 | D2 |

(b)

| T | SHELF LABEL 13a | SHELF LABEL 13b | SHELF LABEL 13c |
|---|---|---|---|
| 1 | D1 | D2 | D2 |
| 2 | D2 | D2 | D2 |
| 3 | D2 | D1 | D2 |
| 4 | D2 | D2 | D1 |
| 5 | D1 | D2 | D2 |
| 6 | D2 | D2 | D2 |
| 7 | D2 | D1 | D2 |
| 8 | D2 | D2 | D1 |
| 9 | D1 | D2 | D2 |
| 10 | D2 | D2 | D2 |
| 11 | D2 | D1 | D2 |
| 12 | D2 | D2 | D1 |

(c)

| T | SHELF LABEL 13a | SHELF LABEL 13b | SHELF LABEL 13c |
|---|---|---|---|
| 1 | D1 | D2 | D2 |
| 2 | D2 | D1 | D2 |
| 3 | D2 | D2 | D2 |
| 4 | D2 | D2 | D1 |
| 5 | D1 | D2 | D2 |
| 6 | D2 | D1 | D2 |
| 7 | D2 | D2 | D2 |
| 8 | D2 | D2 | D1 |
| 9 | D1 | D2 | D2 |
| 10 | D2 | D1 | D2 |
| 11 | D2 | D2 | D2 |
| 12 | D2 | D2 | D1 |

(d)

| T | SHELF LABEL 13a | SHELF LABEL 13b | SHELF LABEL 13c |
|---|---|---|---|
| 1 | D2 | D2 | D2 |
| 2 | D2 | D1 | D2 |
| 3 | D2 | D2 | D1 |
| 4 | D1 | D2 | D2 |
| 5 | D2 | D2 | D2 |
| 6 | D2 | D1 | D2 |
| 7 | D2 | D2 | D1 |
| 8 | D1 | D2 | D2 |
| 9 | D2 | D2 | D2 |
| 10 | D2 | D1 | D2 |
| 11 | D2 | D2 | D1 |
| 12 | D1 | D2 | D2 |

61
- NUMBER OF COMMODITIES M
- UPDATE DATA 1 (COMMODITY CODE,SHELF SECTION,COMMODITY NAME,UNIT PRICE)
- UPDATE DATA 2 (COMMODITY CODE,SHELF SECTION,COMMODITY NAME,UNIT PRICE)
- UPDATE DATA M (COMMODITY CODE,SHELF SECTION,COMMODITY NAME,UNIT PRICE)

62
- NUMBER OF CONSOLIDATIONS N
- CONSOLIDATION DIRECTION X or Y
- DIVIDED IMAGE DATA G1
- DIVIDED IMAGE DATA GN

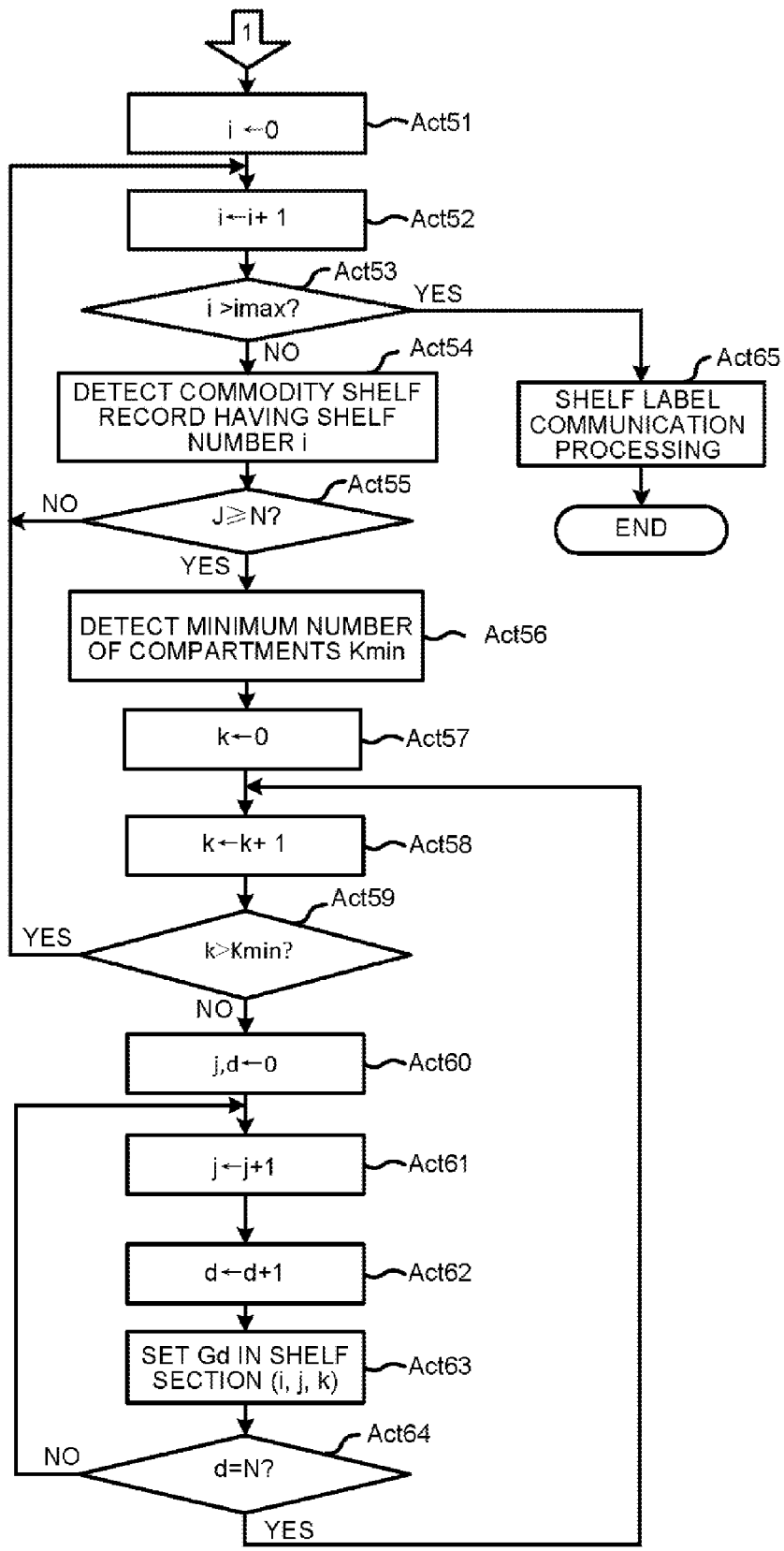

ELECTRONIC SHELF LABEL SYSTEM, ELECTRONIC SHELF LABEL TERMINAL, ELECTRONIC SHELF LABEL SERVER AND CONTROL METHOD FOR THE SAME

CROSS-REFERENCE TO RELATED APPLICATION

This application is based upon and claims the benefit of priority from Japanese Patent Application No. 2014-006184, filed Jan. 16, 2014, the entire contents of which are incorporated herein by reference.

FIELD

Embodiments described herein relate generally to an electronic shelf label system, an electronic shelf label terminal and an electronic shelf label server which are used in the electronic shelf label system, and a control method for enabling a computer to function as the electronic shelf label server.

BACKGROUND

An electronic shelf label terminal is generally arranged at the front side of a commodity shelf so as to display the price of a commodity displayed on the commodity shelf for a customer. In such an electronic shelf label terminal, there is already known a terminal which is capable of switching from a first screen for displaying the price of the commodity to a second screen for displaying other information.

The electronic shelf label terminal can be used more effectively if it is capable of displaying information (hereinafter referred to as customer-oriented information) having an advertising effect on the customer using the second screen. However, the size of the electronic shelf label terminal is small and the amount of the information that can be displayed is limited, thus, it is difficult to display the customer-oriented information indicating a large amount of information on one electronic shelf label terminal. In a case in which the information amount of the customer-oriented information is large, it is considered to divide the customer-oriented information into a plurality of parts and display the divided parts on a plurality of electronic shelf label terminals. In this case, it is necessary to switch the display screens of the plurality of electronic shelf label terminals to the second screen simultaneously. Thus, it only needs to constitute a system in which synchronous signals are sent from, for example, a server managing each electronic shelf label terminal, and each electronic shelf label terminal receiving the synchronous signal switches the display screen from the first screen to the second screen.

However, in such a synchronous signal-sending type system, it is necessary to always keep each electronic shelf label terminal in a state in which it is capable of receiving the synchronous signal. The power of the electronic shelf label terminal is consumed in the synchronous signal reception standby state. Generally, the electronic shelf label terminal is equipped with a battery as the main power source, and the consumption of power due to the synchronous signal reception standby state may lead to short life of the battery. Thus, the synchronous signal-sending type system cannot be applied.

BRIEF DESCRIPTION OF THE DRAWINGS

FIG. 7 is a schematic view illustrating a transition example of the image displayed on the electronic shelf label terminal;

FIG. 15 is a flowchart illustrating a procedure of a reception processing executed by the CPU of the shelf label server which received the second image file.

DETAILED DESCRIPTION

In accordance with one embodiment, an electronic shelf label system comprises a plurality of electronic shelf label terminals configured to be arranged on a commodity shelf in at least one direction; wherein each electronic shelf label terminal includes a display section, a first image storage section in which a first image containing the price of a commodity displayed on the commodity shelf equipped with the electronic shelf label terminal is stored, a second image storage section in which a second image consisting of n (n≥2) parts simultaneously displayed on each display section of n (n≥2) electronic shelf label terminals arranged in one direction is stored, and a control section configured to repeatedly carry out a control to continuously display the second image stored in the second image storage section for a time which is n times greater than the display time of the first image at a predetermined interval after displaying the first image stored in the first image storage section for a time at a predetermined interval on the display section.

Hereinafter, the embodiment of the electronic shelf label system is described with reference to the accompanying drawings.

[Description of Electronic Shelf Label System]

Figure 1:
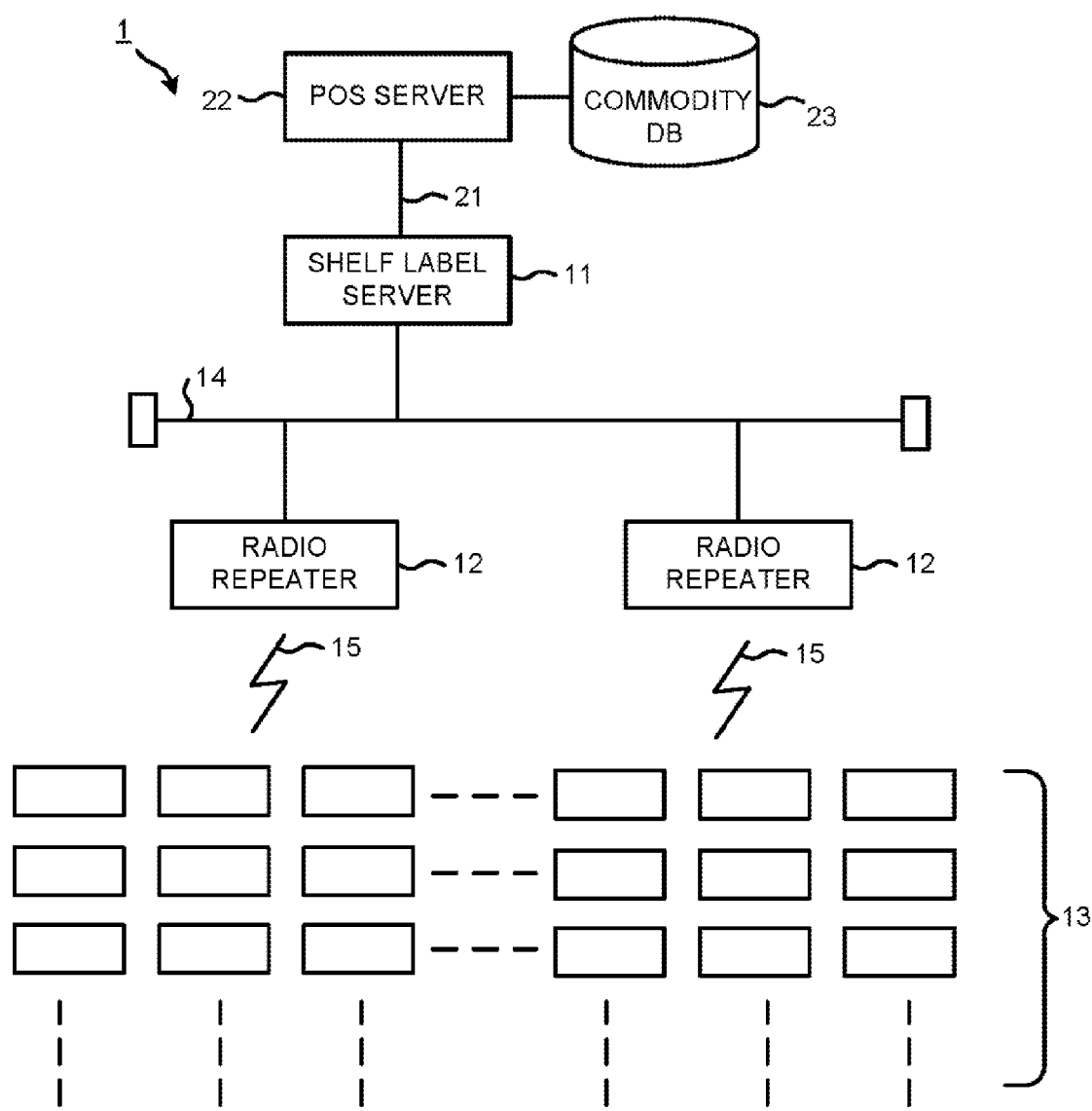
FIG. 1 is a diagram illustrating the whole constitution of an electronic shelf label system.

FIG. 1 is a diagram illustrating the whole constitution of an electronic shelf label system 1. The system 1 comprises a shelf label server 11, a plurality of radio repeaters 12 and a plurality of electronic shelf label terminals 13. The system 1 comprises a network 14 such as a LAN (Local Area Network) through which the shelf label server (electronic shelf label server) 11 can communicate with the radio repeater 12. The system 1 further comprises a radio communication network 15 which takes the plurality of electronic shelf label terminals 13 as slave stations and takes any of the radio repeaters 12 as a master station. In this way, the shelf label server 11 carries out data communication with each electronic shelf label terminal 13 through the network 14, the radio repeater 12 and the radio communication network 15.

The shelf label server 11 is also connected with a server (hereinafter referred to as a "POS server") 22 of a POS system through a server-to-server network 21. The POS server 22 manages a commodity database 23 in which commodity specific information such as the name of a commodity (commodity name), price (unit price) and the like and point-of-sale information such as wholesale volume, sales volume, stock volume and the like are stored in association with a commodity code used to identify each commodity. The POS server 22 sends the price information to the shelf label server 11 through the server-to-server network 21 in a case in which, for example, the price of the commodity is changed. The shelf label server 11 specifies, through a well-known method, the electronic shelf label terminal 13 on which the information of the commodity changed in price is displayed, and sends the price information after the change to the specified electronic shelf label terminal 13. The electronic shelf label terminal 13, which receives the price information after the change, changes the price displayed on the display section to the price after the change.

[Description of Electronic Shelf Label Terminal]

Figure 2:
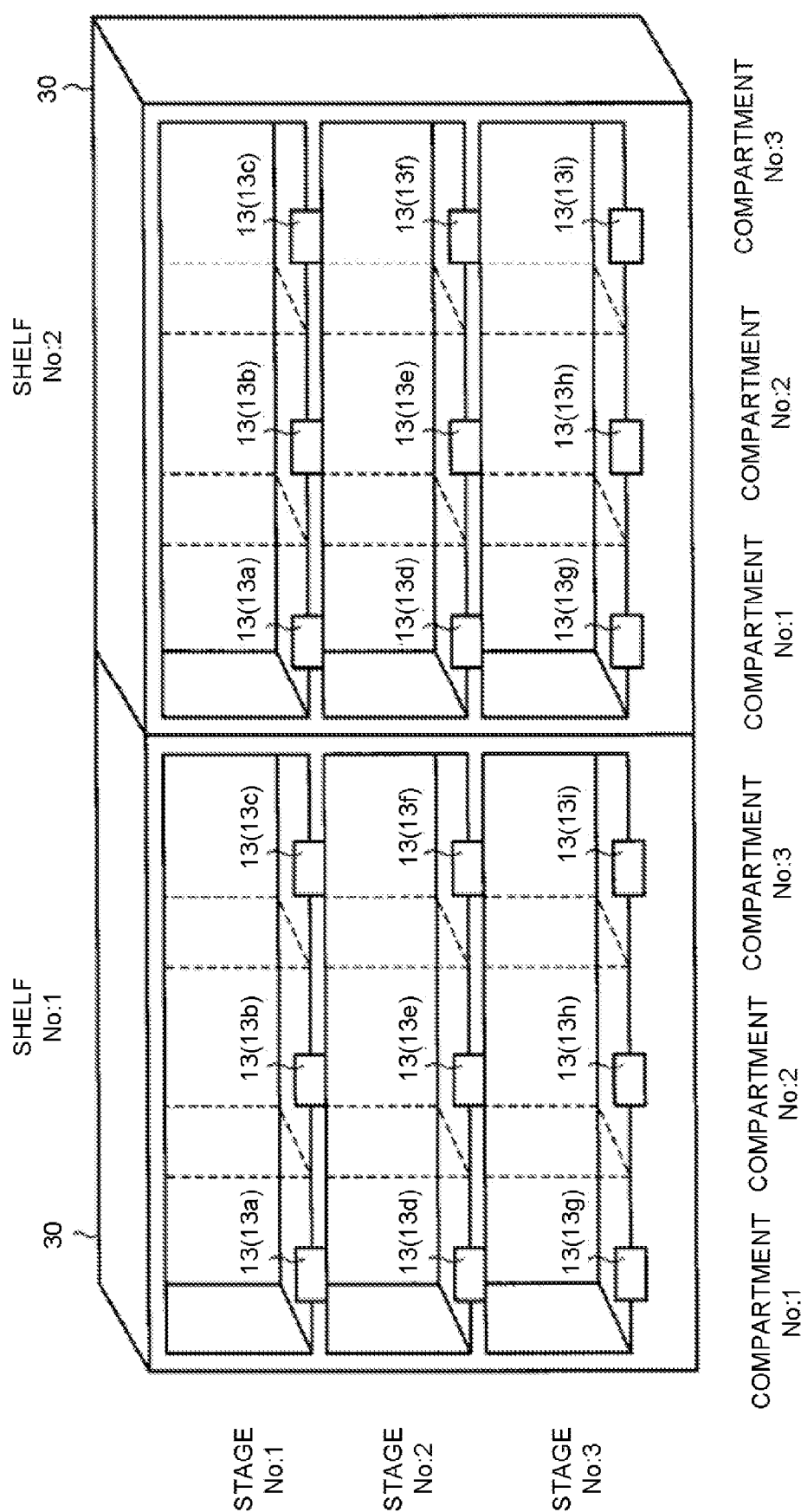
FIG. 2 is a perspective view illustrating one example of a commodity shelf on which an electronic shelf label terminal is arranged.

As shown in FIG. 2, each electronic shelf label terminal 13 is attached to the front side of the commodity shelf 30 where each commodity is classified and displayed for each item. Each electronic shelf label terminal 13 is arranged on the commodity shelf 30 in such a manner that one electronic shelf label terminal 13 is assigned for one item. In FIG. 2, nine items of commodities can be displayed on the commodity shelf 30 divided into three stages each of which is divided into three compartments. On such a commodity shelf 30, nine electronic shelf label terminals 13 (13a~13i) are arranged in a matrix state of vertical 3 *horizontal 3.

Figure 3:
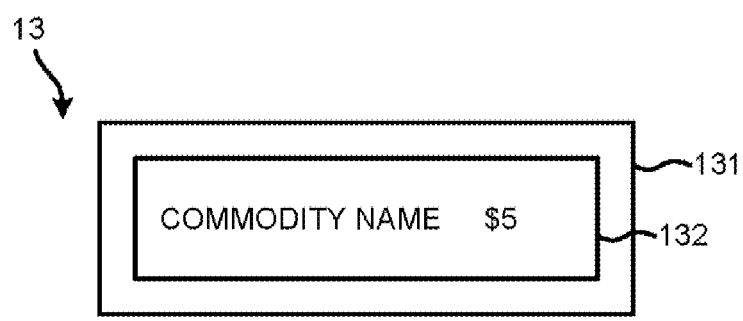
FIG. 3 is a front view illustrating one example of the electronic shelf label terminal.

As shown in FIG. 3, each electronic shelf label terminal 13 includes a display device 132 serving as the display section arranged at the front surface of a label-like terminal main body 131. The name and the price of a corresponding commodity are displayed on the display device 132 as a first screen. Further, customer-oriented information having an advertising effect on the customer can be displayed on the display device 132 as a second screen.

Figure 4:
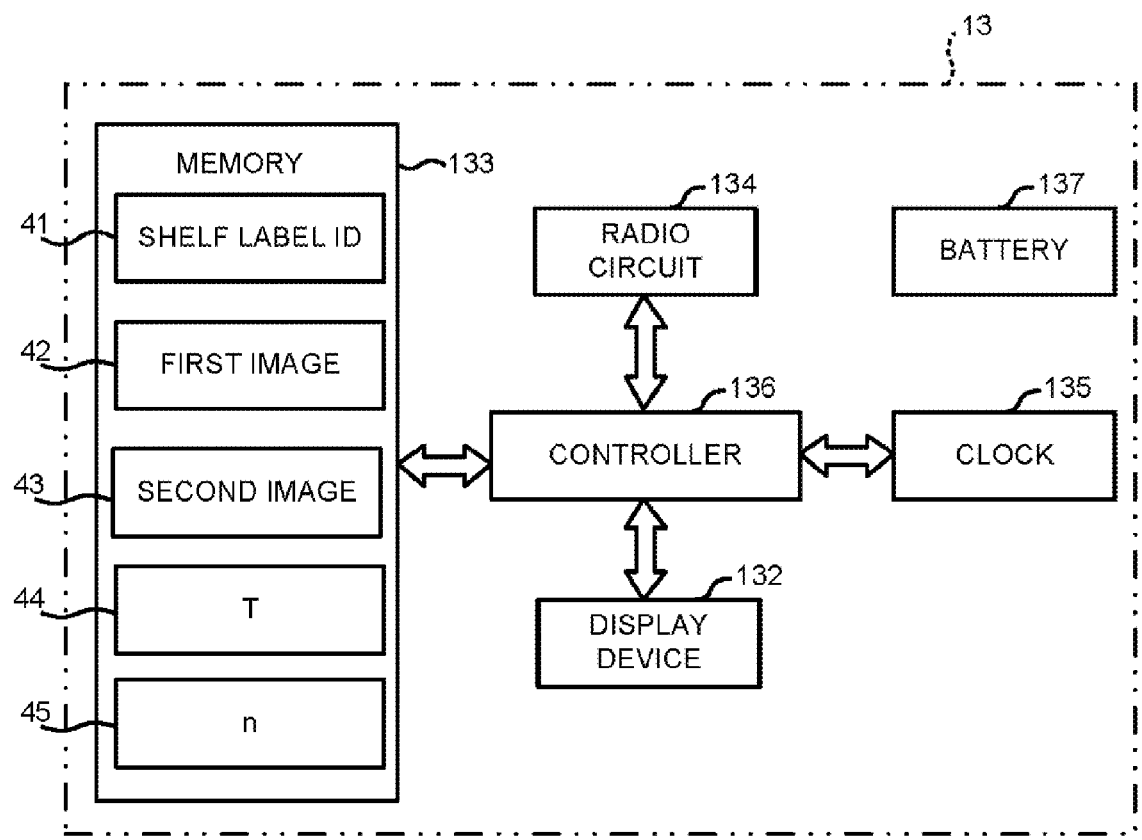
FIG. 4 is a block diagram illustrating the constitution of the main portions of the electronic shelf label terminal.

FIG. 4 is a block diagram illustrating the constitution of the main portions of the electronic shelf label terminal 13. The electronic shelf label terminal 13 further includes a memory 133, a radio circuit 134, a clock oscillator 135, a controller 136 and a battery 137, in addition to the display device 132. The battery 137 serves as a power source for driving the display device 132, the memory 133, the radio circuit 134 and the controller 136.

The electronic shelf label terminal 13 forms at least a shelf label ID area 41, a first image area 42, a second image area 43, a set time area 44 and a multiple area 45 in the memory 133. The shelf label ID area 41 stores a unique terminal ID which is set for each terminal to identify each electronic shelf label terminal 13 individually. The first image area 42 and the second image area 43 store first image data and second image data sent from the shelf label server 11, respectively. The set time area 44 stores a random time T set as the display time of the first image data. The multiple area 45 stores a multiple n sent from the shelf label server 11. The initial value of the multiple n is "0", and a value equal to or greater than "2" is appropriately sent from the shelf label server 11.

The first image data enables to display an image for specifying the commodity displayed on the commodity shelf 30 equipped with the electronic shelf label terminal 13. The second image data enables to display an image of the customer-oriented information. The image of the customer-oriented information is divided into n parts each of which is displayed simultaneously on each display device 132 of n (n≥2) electronic shelf label terminals 13 arranged in one direction, and each part is consolidated to form the image of the customer-oriented information. Herein, the first image area 42 functions as a first image storage section and the second image area 43 functions as a second image storage section. Further, the multiple area 45 functions as a numeric storage section for storing the multiple n in a changeable manner.

Figure 5:
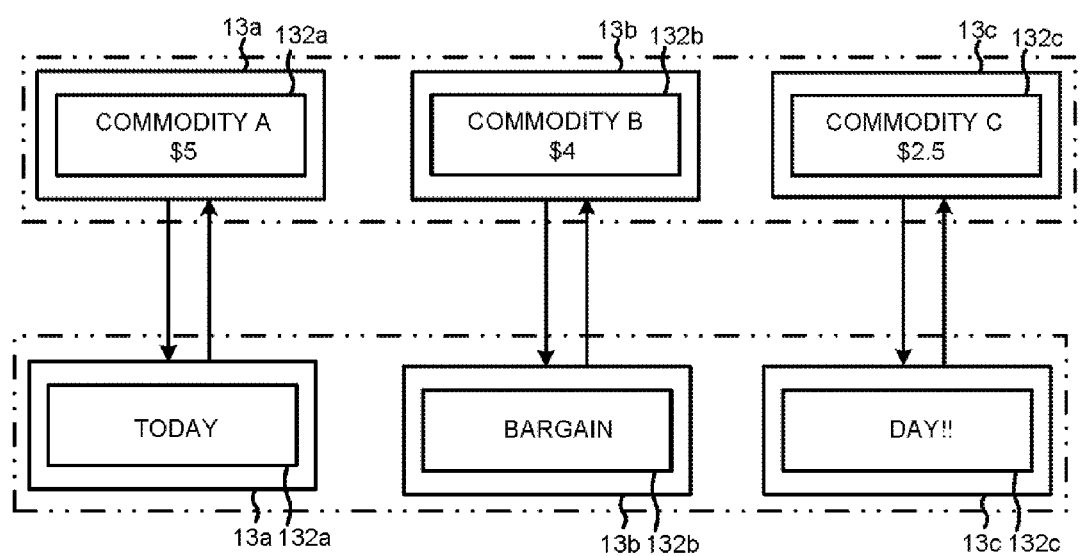
FIG. 5 is an illustration diagram illustrating first images and second images displayed on the electronic shelf label terminal.

An example of a first image based on the first image data and a second image based on the second image data is shown in FIG. 5. In this example, an image of a character string "today bargain day!!" notifying the customer that today is a bargain day is displayed as the second image formed by displaying characters on each display device 132a, 132b and 132c of three electronic shelf label terminals 13a, 13b and 13c simultaneously.

If the character string "today bargain day!!" is displayed on the display device 132 of one electronic shelf label terminal 13, the characters are too small to be noticed, which is inappropriate. Thus, in the example shown in FIG. 5, the character string "today bargain day!!" is divided every 2~3 characters from the beginning to the end of the character string to create three character groups, that is, "today", "bargain" and "day!!". Then in the three adjacent electronic shelf label terminals 13a, 13b and 13c, the character group "today" is displayed on the left electronic shelf label terminal 13a, the character group "bargain" is displayed on the center electronic shelf label terminal 13b, and the character group "day!!" is displayed on the right electronic shelf label terminal 13c. In this way, the character string "today bargain day!!" is displayed in large size on the display devices 132a, 132b and 132c of each electronic shelf label terminal 13a, 13b and 13c.

Figure 6:
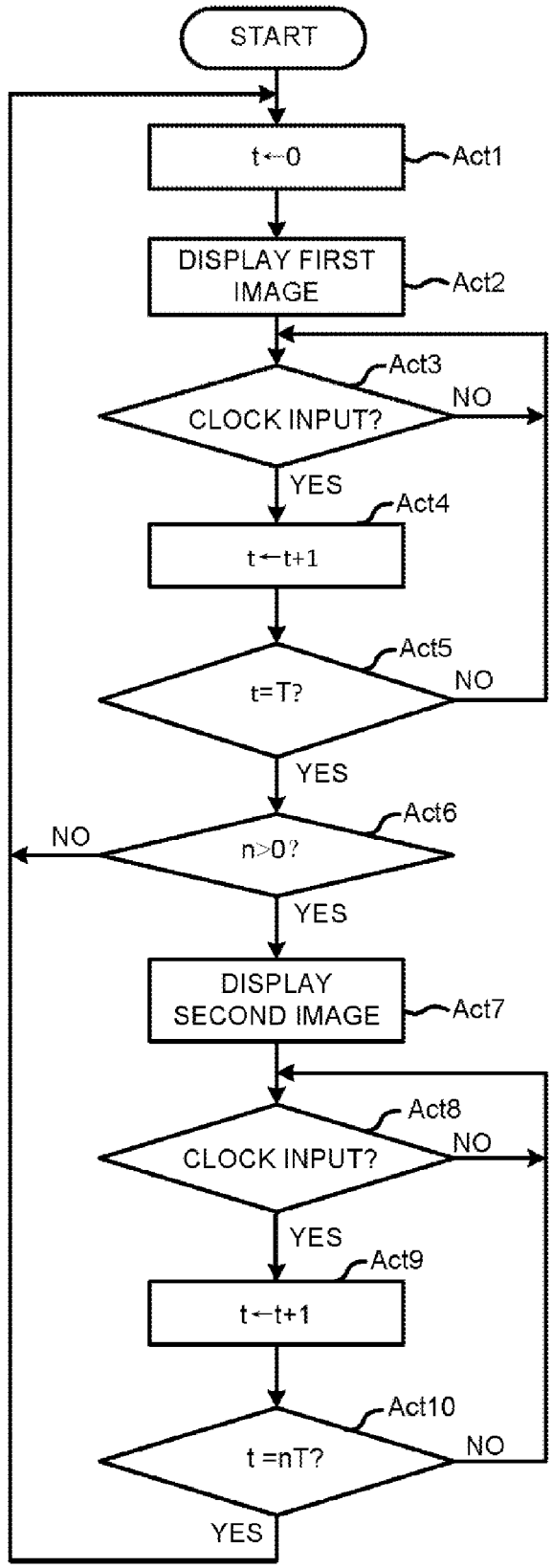
FIG. 6 is a flowchart illustrating a procedure of a control executed by a controller of the electronic shelf label terminal.

FIG. 6 is a flowchart illustrating a procedure of a control carried out by the controller 136. The procedure is executed according to a pre-installed control program. The control program is started when a start command is received from the shelf label server 11. The start command is sent from the shelf label server 11 to each electronic shelf label terminal 13 simultaneously at, for example, a preset time of one day.

When the control program is started, the controller 136 first resets a timer counter t to "0" (ACT 1). The controller 136 reads the first image data from the first image area 42 and displays the first image based on the data on the display device 132 (ACT 2). In addition, the processing order of ACT 1 and ACT 2 may be reversed.

After the first image data is displayed on the display device 132, the controller 136 waits until a clock signal is input from clock oscillator 135 (ACT 3). In a case in which the clock signal is input (YES in ACT 3), the controller 136 counts up the timer counter t by "1" (ACT 4). Then controller 136 determines whether or not the timer counter t reaches the time T set in the set time area 44 (ACT 5). In a case in which the timer counter t does not reach the time T (NO in ACT 5), the controller 136 returns to the processing in ACT 3 to wait until a next clock signal is input. If the clock signal is input (YES in ACT 3), the controller 136 counts up the timer counter t by "1" (ACT 4), and then determines whether or not the timer counter t reaches the time T (ACT 5).

As stated above, the controller 136 counts up the timer counter t every time the clock signal is input, and waits until the timer counter t reaches the time T. When the timer counter t reaches the time T (YES in ACT 5), the controller 136 determines whether or not the multiple n stored in the multiple area 45 is greater than "0" (ACT 6). In a case in which the multiple n is "0" (NO in ACT 6), the controller 136 returns to execute the processing in ACT 1.

On the contrary, in a case in which the multiple n is not "0", that is, the multiple n is equal to or greater than "2" (YES in ACT 6), the controller 136 reads the second image data from the second image area 43, and displays the second image based on the data on the display device 132 (ACT 7).

After the second image data is displayed on the display device 132, the controller 136 waits until the clock signal is input from the clock oscillator 135 (ACT 8). In a case in which the clock signal is input (YES in ACT 8), the controller 136 counts up the timer counter t by "1" (ACT 9). Then the controller 136 determines whether or not the timer counter t reaches a minimum display time nT of the second image (ACT 10). The minimum display time nT of the second image is a value obtained by multiplying the time T set in the set time area 44 by the multiple n stored in the multiple area 45.

In a case in which the timer counter t does not reach the minimum display time nT (NO in ACT 10), the controller 136 returns to the processing in ACT 8 to wait until a next clock signal is input. If the clock signal is input (YES in ACT 8), the controller 136 counts up the timer counter t by "1" (ACT 9), and then determines whether or not the timer counter t reaches the minimum display time nT (ACT 10).

As stated above, the controller 136 counts up the timer counter t every time the clock signal is input, and waits until the timer counter t reaches the minimum display time nT. When the timer counter t reaches the minimum display time nT (YES in ACT 10), the controller 136 returns to the processing in ACT 1. That is, the controller 136 resets the timer counter t to "0". Then the controller 136 reads the first image data from the first image area 42 and displays the first image based on the data on the display device 132.

Herein, the controller 136 constitutes a control section which repeatedly carries out a control to continuously display the second image stored in the second image area 43 for the time nT which is n times greater than the time T at a predetermined interval after displaying the first image stored in the first image area 42 for the time T at a predetermined interval on the display device 132.

Herein, a case in which the character string "today bargain day!!" as shown in FIG. 5 is displayed on the three electronic shelf label terminals 13a, 13b and 13c as a specific example of the second image is described.

In this case, within the three adjacent electronic shelf label terminals 13a, 13b and 13c, the image data of "commodity A $5" is stored as the first image data and the image data of the character group "today" is stored as the second image data in the left electronic shelf label terminal 13a; the image data of "commodity B $4" is stored as the first image data and the image data of the character group "bargain" is stored as the second image data in the center electronic shelf label terminal 13b; the image data of "commodity C $2.5" is stored as the first image data and the image data of the character group "day!!" is stored as the second image data in the right electronic shelf label terminal 13c. Further, "3" is stored in the multiple area 45 of each electronic shelf label terminal 13a, 13b and 13c as the multiple n. In this state, the controller 136 of each electronic shelf label terminal 13a, 13b and 13c respectively controls each section according to the procedure shown in FIG. 6.

That is, the controller 136 of the electronic shelf label terminal 13a repeatedly carries out a control to display the second image "today" continuously for a time 3T after displaying the first image "commodity A $5" for the time T on the display device 132a. The controller 136 of the electronic shelf label terminal 13b repeatedly carries out a control to display the second image "bargain" continuously for the time 3T after displaying the first image "commodity B $4" for the time T on the display device 132b. The controller 136 of the electronic shelf label terminal 13c repeatedly carries out a control to display the second image "day!!" continuously for the time 3T after displaying the first image "commodity C $2.5" for the time T on the display device 132c.

FIG. 7 (*a*)~FIG. 7 (*d*) show transition examples of images displayed on the display devices 132a, 132b and 132c of each electronic shelf label terminal 13a, 13b and 13c every time the time T elapses. In FIG. 7, the mark D1 indicates the first image and the mark D2 indicates the second image.

In a case of FIG. 7 (*a*), in the electronic shelf label terminal 13a, the first image "commodity A $5" is displayed at the timing of time T=1, 5 and 9; and the second image "today" is displayed at the timing of time T=2~4, 6~8 and 10~12. In the electronic shelf label terminal 13b, the first image "commodity B $4" is displayed at the timing of time T=2, 6 and 10; and the second image "bargain" is displayed at the timing of time T=1, 3~5, 7~9 and 11~12. In the electronic shelf label terminal 13c, the first image "commodity C $2.5" is displayed at the timing of time T=3, 7 and 11; and the second image "day!!" is displayed at the timing of time T=1~2, 4~6, 8~10 and 12. Thus, at the timing of time T=4, 8 and 12, the second image is displayed on each of the display devices 132a, 132b and 132c of each electronic shelf label terminal 13a, 13b and 13c; in this way, the character string "today bargain day!!" is displayed.

In a case of FIG. 7 (*b*), in the electronic shelf label terminal 13a, the first image "commodity A $5" is displayed at the timing of time T=1, 5 and 9; and the second image "today" is displayed at the timing of time T=2~4, 6~8 and 10~12. In the electronic shelf label terminal 13b, the first image "commodity B $4" is displayed at the timing of time T=2, 6 and 10; and the second image "bargain" is displayed at the timing of time T=1, 3~5, 7~9 and 11~12. In the electronic shelf label terminal 13c, the first image "commodity C $2.5" is displayed at the timing of time T=4, 8 and 12; and the second image "day!!" is displayed at the timing of time T=1~3, 5~7 and 9~11. Thus, at the timing of time T=3, 7 and 11, the second image is displayed on each of the display devices 132a, 132b and 132c of each electronic shelf label terminal 13a, 13b and 13c; in this way, the character string "today bargain day!!" is displayed.

In a case of FIG. 7 (*c*), in the electronic shelf label terminal 13a, the first image "commodity A $5" is displayed at the timing of time T=1, 5 and 9; and the second image "today" is displayed at the timing of time T=2~4, 6~8 and 10~12. In the electronic shelf label terminal 13b, the first image "commodity B $4" is displayed at the timing of time T=3, 7 and 11; and the second image "bargain" is displayed at the timing of time T=1~2, 4~6, 8~10 and 12. In the electronic shelf label terminal 13c, the first image "commodity C $2.5" is displayed at the timing of time T=4, 8 and 12; and the second image "day!!" is displayed at the timing of time T=1~3, 5~7 and 9~11. Thus, at the timing of time T=2, 6 and 10, the second image is displayed on each of the display devices 132a, 132b and 132c of each electronic shelf label terminal 13a, 13b and 13c; in this way, the character string "today bargain day!!" is displayed.

In a case of FIG. 7 (d), in the electronic shelf label terminal 13a, the first image "commodity A $5" is displayed at the timing of time T=4, 8 and 12; and the second image "today" is displayed at the timing of time T=1~3, 5~7 and 9~11. In the electronic shelf label terminal 13b, the first image "commodity B $4" is displayed at the timing of time T=2, 6 and 10; and the second image "bargain" is displayed at the timing of time T=1, 3~5, 7~9 and 11~42. In the electronic shelf label terminal 13c, the first image "commodity C $2.5" is displayed at the timing of time T=3, 7 and 11; and the second image "day!!" is displayed at the timing of time T=1~2, 4~6, 8~10 and 12. Thus, at the timing of time T=1, 5 and 9, the second image is displayed on each of the display devices 132a, 132b and 132c of each electronic shelf label terminal 13a, 13b and 13c; in this way, the character string "today bargain day!!" is displayed.

In this way, in accordance with the present embodiment, the customer-oriented information indicating a large amount of information can be displayed with the plurality of electronic shelf label terminals 13. In this case, the electronic shelf label terminal 13 is not necessarily to be always in a state in which it is capable of receiving the synchronous signal, thus, there is no worry that the power of the electronic shelf label terminal 13 is consumed because of the reception standby state. In this way, there can be provided an electronic shelf label system 1 which can reduce the power consumption of the electronic shelf label terminal and realize the display of the customer-oriented information with the plurality of electronic shelf label terminals 13.

[Description of Shelf Label Server]

Figure 8:
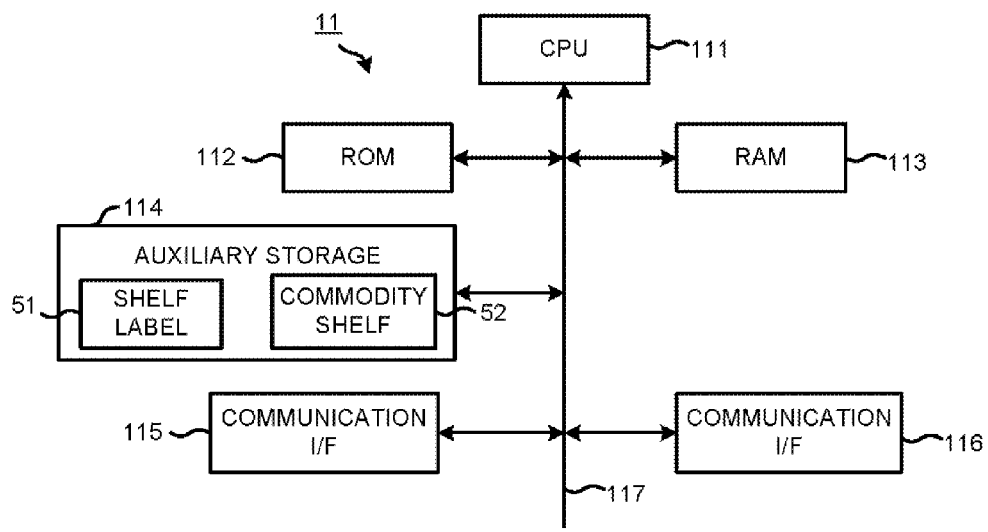
FIG. 8 is a block diagram illustrating the constitution of the main portions of a shelf label server.

FIG. 8 is a block diagram illustrating the constitution of the main portions of the shelf label server 11. As shown in FIG. 8, the shelf label server 11 includes a CPU (Central Processing Unit), a ROM (Read Only Memory) 112, a RAM (Random Access Memory) 113, an auxiliary storage device 114, a first communication interface 115 and a second communication interface 116. The shelf label server 11 connects the CPU 111 with the ROM 112, the RAM 113, the auxiliary storage device 114, the first communication interface 115 and the second communication interface 116 through a bus line 117 such as an address bus, a data bus and the like to constitute a control circuit.

The CPU 111 is a central part of a computer. The CPU 111 controls each section of the shelf label server 11 to realize various functions of the shelf label server 11 according to an operating system and an application program.

The ROM 112 is a main storage part of the computer. The ROM 112 stores the operating system and the application program mentioned above. As occasion demands, the ROM 112 also stores data referred to with the CPU 111 which carries out processing to control each section.

The RAM 113 is also a main storage part of the computer. The RAM 113 stores data referred to with the CPU 111 which carries out various processing. The RAM 113 is further used as a so-called work area for rewriting information appropriately by the CPU 111.

The auxiliary storage device 114 is an auxiliary storage part of the computer. The auxiliary storage device 114 is, for example, an EEPROM (Electric Erasable Programmable Read-Only Memory), a HDD (hard disc drive), or a SSD (solid state drive) and the like. The auxiliary storage device 114 stores data used by the CPU 111 which carries out various processing and data generated through the processing carried out by the CPU 111. As occasion demands, the auxiliary storage device 114 also stores the application program mentioned above.

The first communication interface 115 carries out data communication according to a predetermined communication protocol with the POS server 22 which is connected through the server-to-server network 21. The second communication interface 116 carries out data communication according to a predetermined communication protocol with each radio repeater 12 connected through the network 14.

The shelf label server 11 stores a shelf label database 51 and a commodity shelf database 52 in the auxiliary storage device 114.

Figure 9:
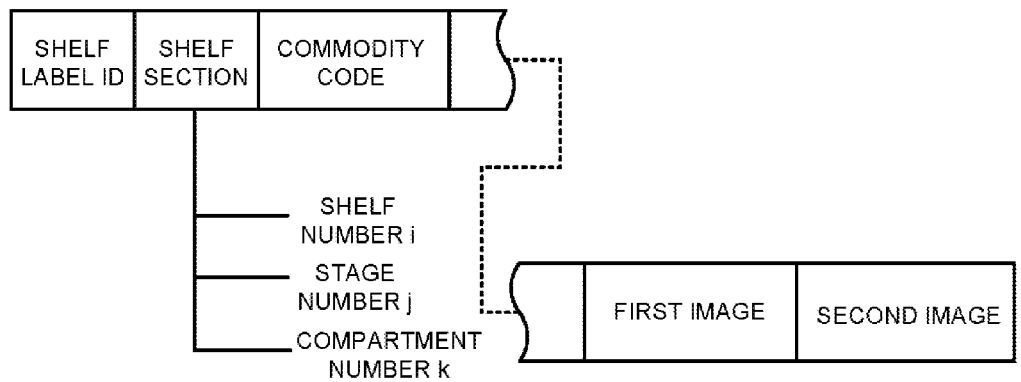
FIG. 9 is a schematic view illustrating the data structure of a shelf label record stored in a shelf label database.

The shelf label database 51 stores a shelf label record 51R created for each electronic shelf label terminal 13. The data structure of the shelf label record 51R is shown in FIG. 9. As shown in FIG. 9, the shelf label record 51R includes items such as a shelf label ID, a shelf section, a commodity code, a first image data and a second image data.

The shelf label ID is stored in a shelf label ID area 41 of the electronic shelf label terminal 13 corresponding to the shelf label record 51R.

The shelf section is data used to specify the location of the commodity shelf 30 on which the electronic shelf label terminal 13 corresponding to the shelf label record 51R is arranged. The shelf section includes a shelf number i, a stage number j and a compartment number k. The shelf number i is a continuous number which starts from "1" and is uniquely assigned to each commodity shelf 30. The stage number j is a continuous number which starts from "1" and is sequentially assigned to each stage from the upper stage of the commodity shelf 30. The compartment number k is a continuous number (starting from "1") sequentially assigned to each compartment from the left side of the commodity shelf 30 for each compartment in which one item of commodities of each stage in the commodity shelf 30 is displayed. For example, in FIG. 2, in a case in which the shelf number i of the left commodity shelf 30 is set to "1", the shelf section [i, j, k] of the shelf label record 51R for the electronic shelf label terminal 13a arranged in a compartment at the left end in the upmost stage of the commodity shelf 30 is [1, 1, 1]. Further, the shelf section [i, j, k] of the shelf label record 51R for the electronic shelf label terminal 13b arranged in a compartment at the right side of the compartment mentioned above is [1, 1, 2], and the shelf section [i, j, k] of the shelf label record 51R for the electronic shelf label terminal 13c arranged in a compartment at the right end is [1, 1, 3].

The commodity code is an identification code of the commodity displayed in the compartment of the commodity shelf 30 on which the electronic shelf label terminal 13 corresponding to the shelf label record 51R is arranged.

The first image data and the second image data are stored in the first image area 42 and the second image area 43 of the electronic shelf label terminal 13 corresponding to the shelf label record 51R.

Herein, the shelf label database 51 functions as a shelf label position storage module for storing the position information (shelf section) for the commodity shelf 30 of the plurality of electronic shelf label terminals 13.

Figure 10:
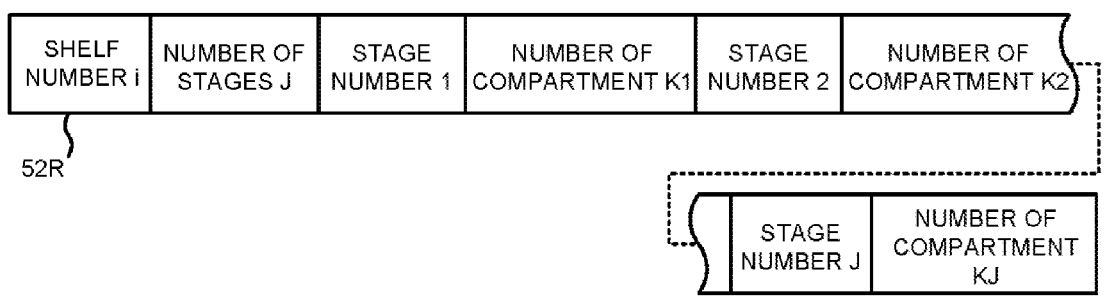
FIG. 10 is a schematic view illustrating the data structure of a commodity shelf record stored in a commodity shelf database.

The commodity shelf database 52 stores a commodity shelf record 52R created for each commodity shelf 30. The data structure of the commodity shelf record 52R is shown in FIG. 10. As shown in FIG. 10, the commodity shelf record 52R includes the shelf number i, the number of stages J and pairs of data of the stage numbers 1~J corresponding to the number of the stages and the number of compartments K1~KJ.

The number of stages J indicates the number of stages of the commodity shelf 30 specified with the shelf number i of the commodity shelf record 52R. The pairs of data include the stage numbers 1~J assigned to each stage of the commodity shelf 30 specified with the shelf number i of the commodity shelf record 52R and the number of compartments K1~KJ specified with the stage numbers 1~J of the commodity shelf 30.

[Management of Commodity Shelf]

Figure 11:
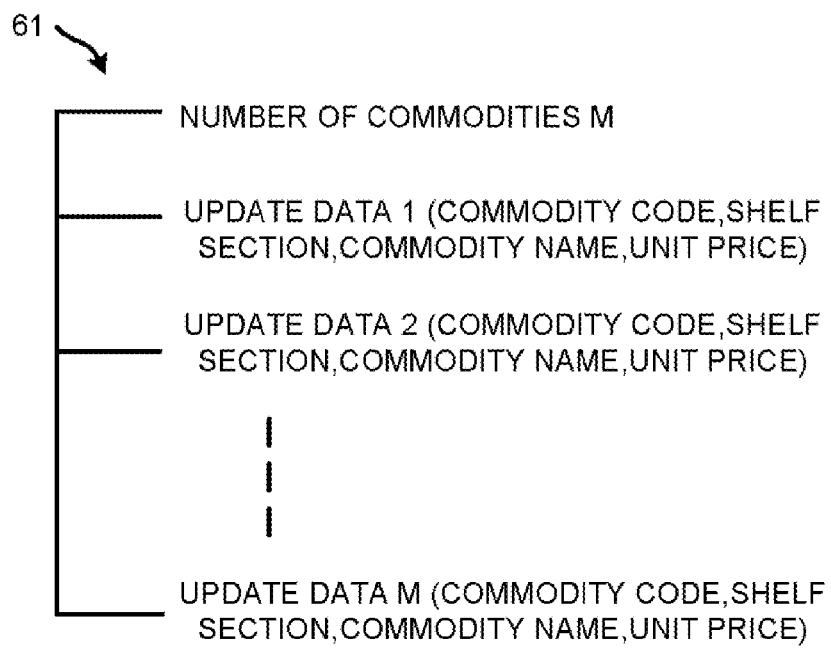
FIG. 11 is a schematic view illustrating the data structure of an update file sent from a POS server to the shelf label server.

Information indicating what kind of commodity is displayed in each compartment of the commodity shelf 30 is managed by the POS server 22. Specifically, the POS server 22 includes a commodity data file in which the shelf section [i, j, k] of the compartment where the commodity is displayed as well as the commodity name and the price of the commodity is set in association with the commodity code of each commodity. For example, in a case in which the display location of the commodity is changed, the POS server 22 changes the shelf section associated with the commodity code of the commodity. Further, in a case in which the price of the commodity is changed, the POS server 22 changes the price associated with the commodity code of the commodity. In a case in which the data (shelf section or price) of the commodity data file is changed, the POS server 22 sends an update file 61 to the shelf label server 11. As shown in FIG. 11, the update file 61 includes the total number M of the commodities of which the data is changed and update data the number of which is equal to the total number M. The update data contains the commodity code, the shelf section, the commodity name and the price of the commodity of which the shelf section or the price is changed.

Figure 13:
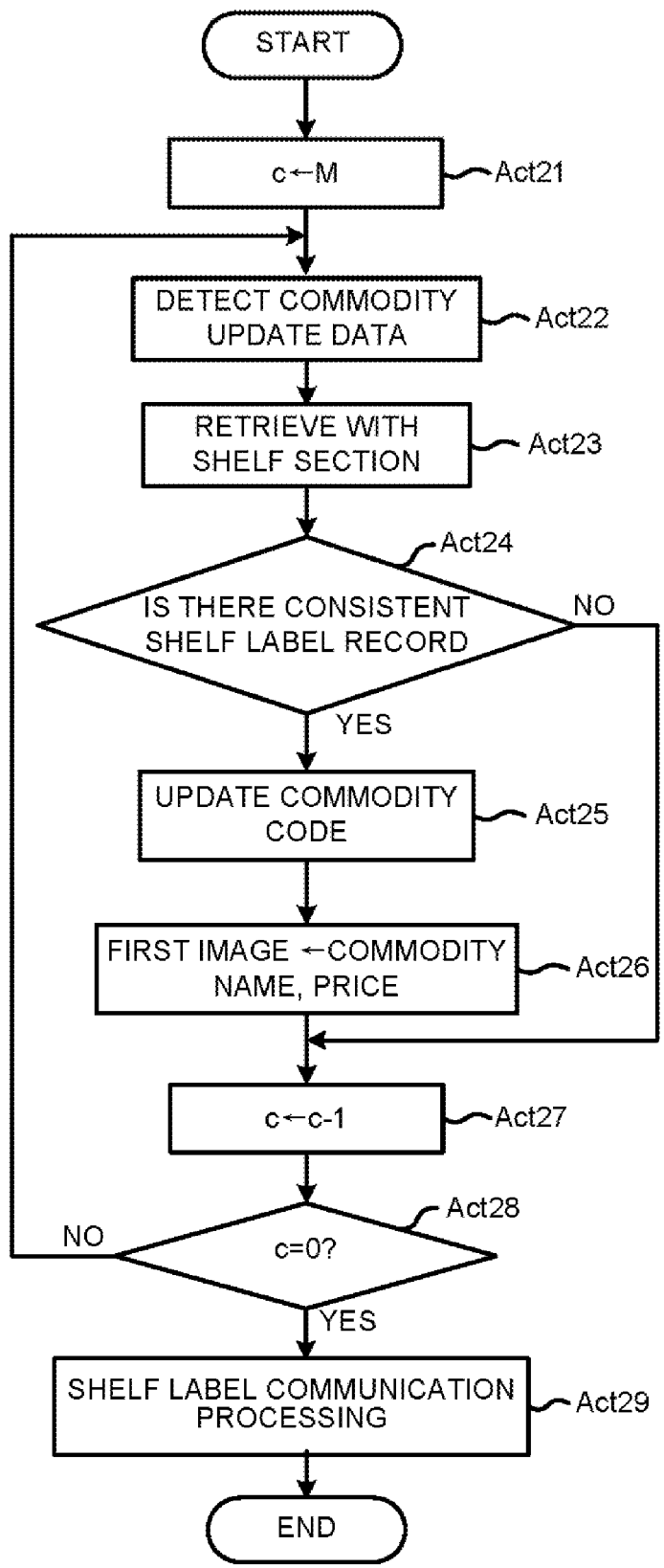
FIG. 13 is a flowchart illustrating a procedure of a reception processing executed by a CPU of the shelf label server which received the update file.

After receiving the update file 61, the CPU 111 of the shelf label server 11 starts a reception processing of a procedure shown in the flowchart in FIG. 13. The procedure of the processing is according to the program stored in the ROM 112 or the auxiliary storage device 114. In addition, the content of the processing shown in FIG. 13 and described below is just exemplified as an example, and the same effect can be achieved through various processing.

First, the CPU 111 detects the total number M from the update file 61 as an initial value of a subtraction counter c (ACT 21). Next, the CPU 111 detects update data m (1≤m≤M) from the update file 61 (ACT 22). The CPU 111 retrieves the shelf label database 51 with the shelf section of the update data m (ACT 23), and determines whether or not there is a shelf label record 51R including the same shelf section (ACT 24)

In a case in which there is no corresponding shelf label record 51R (NO in ACT 24), the CPU 111 proceeds to the processing in ACT 27 without executing the processing in ACT 25 and ACT 26. In a case in which there is a corresponding shelf label record 51R (YES in ACT 24), the CPU 111 proceeds to the processing in ACT 27 after executing the processing in ACT 25 and ACT 26.

In ACT 25, the CPU 111 updates the commodity code of the retrieved shelf label record 51R to the commodity code of the update data m. In ACT 26, the CPU 111 updates the first image data of the retrieved shelf label record 51R to an image including the commodity name and the price of the update data m. In addition, the processing order of ACT 25 and ACT 26 may be reversed. In a case in which the update item of the update data m only includes the shelf section, the processing in ACT 26 may be omitted; while in a case in which the update item of the update data m only includes the price, the processing in ACT 25 may be omitted. Incidentally, in this case, it is necessary to arrange a CPU 111 which is capable of identifying whether the update item of the update data m includes both or either of the shelf section and the price.

In ACT 27, the CPU 111 counts down the subtraction counter c by "1". Then the CPU 111 confirms whether or not the subtraction counter c is "0" (ACT 28). In a case in which the subtraction counter c is greater than "0" (NO in ACT 28), there is unprocessed update data m in the update file. Thus, the CPU 111 returns to the processing in ACT 22. That is, the CPU 111 detects the unprocessed update data m from the update file and executes the processing from ACT 23 to ACT 28 again using the update data m.

After the processing from ACT 23 to ACT 28 is executed for all the update data m contained in the update file, the subtraction counter c becomes "0". In this case (YES in ACT 28), the CPU 111 executes a shelf label communication processing. That is, the CPU 111 sends each shelf label record 51R of the shelf label database 51 to the electronic shelf label terminal 13 identified with the shelf label ID of the corresponding shelf label record 51R (ACT 29). After the shelf label communication processing is completed, the CPU 111 terminates the reception processing.

In this way, if the commodity displayed in a compartment is swapped, the commodity name and the price of the new commodity after the swapping are displayed in the electronic shelf label terminal 13 of the compartment as the first image. Further, if the price of the commodity displayed in a compartment is changed, the price displayed in the first image is updated to the new price after the change in the electronic shelf label terminal 13 of the compartment.

[Management of Customer-Oriented Information]

Figure 12:
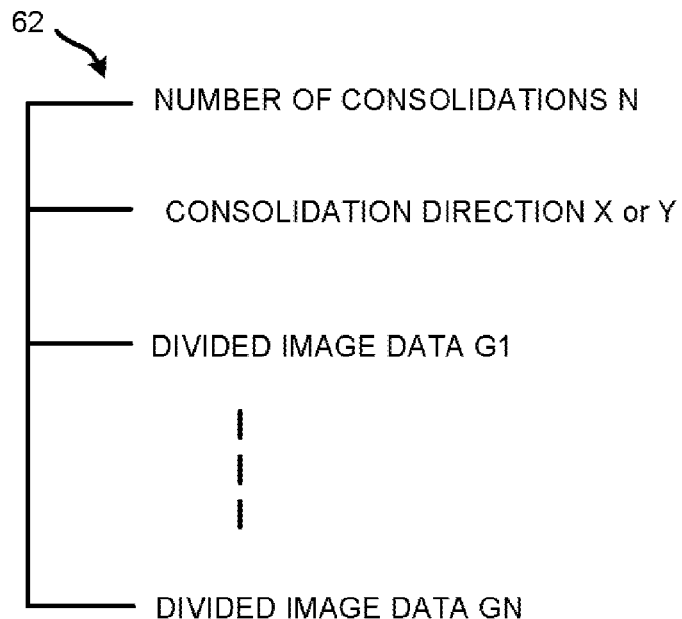
FIG. 12 is a schematic view illustrating the data structure of a second image file sent from the POS server to the shelf label server.

The customer-oriented information displayed on the plurality of electronic shelf label terminals 13 is also managed by the POS server 22. That is, the POS server 22 receives the input of the customer-oriented information through an input device. The customer-oriented information includes the number of consolidations N, a consolidation direction X or Y and divided image data G1~GN corresponding to the number of consolidations N. The number of consolidations N indicates the number of the electronic shelf label terminals 13 required to display the customer-oriented information. The consolidation direction X or Y indicates the arrangement direction of the N electronic shelf label terminals 13 to be used to display the customer-oriented information. In the present embodiment, a direction parallel to the upper surface of the shelf plate of the commodity shelf 30 is set as the X direction and a direction perpendicular to the upper surface is set as the Y direction. The divided image data G1~GN are the data obtained by dividing the customer-oriented information into N (the number of consolidations) parts. When the input of the customer-oriented information is received, the POS server 22 sends a second image file 62 (as shown in FIG. 12) in which the customer-oriented information is stored to the shelf label server 11.

Figure 14:
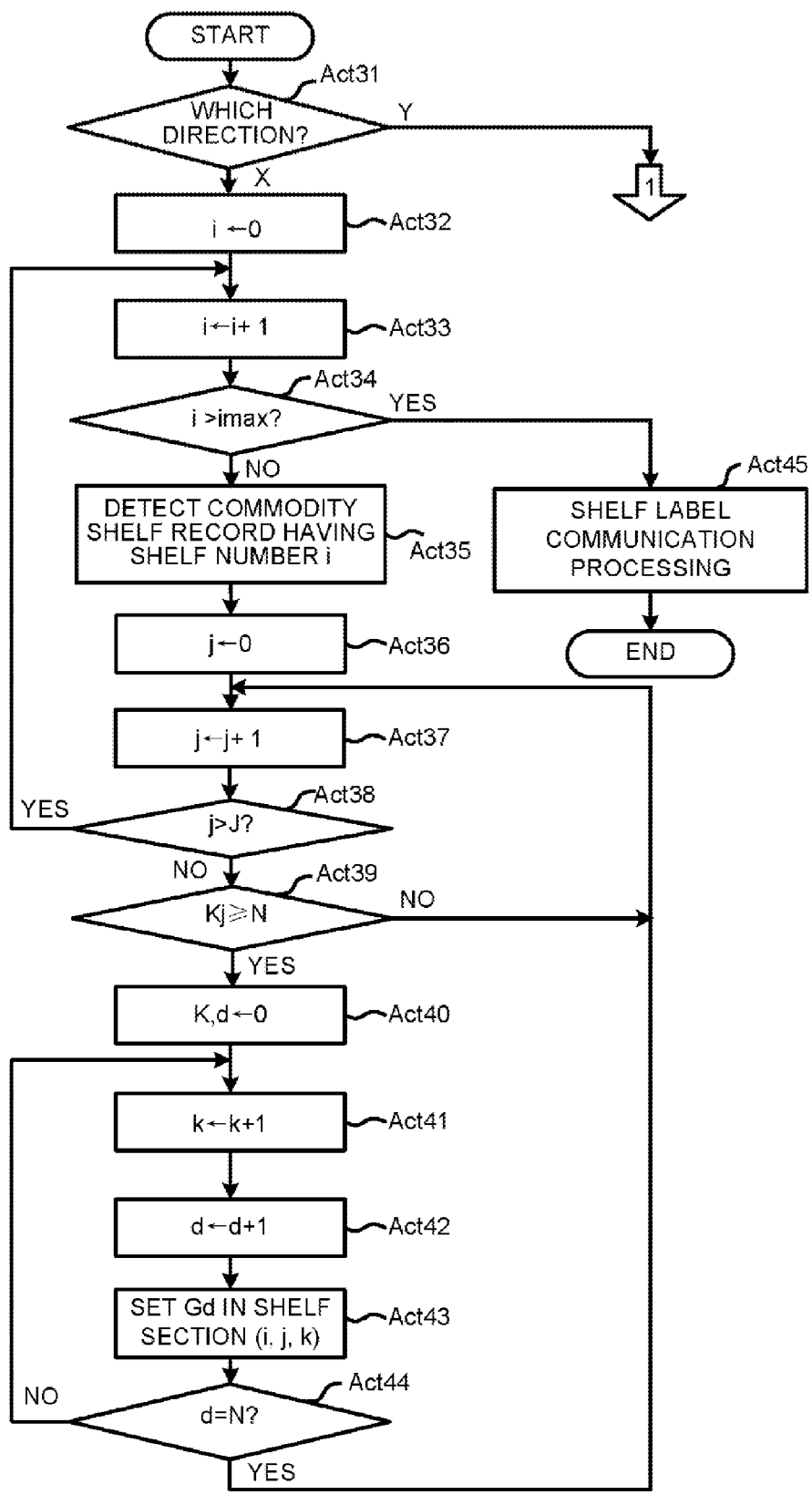
FIG. 14 is a flowchart illustrating a procedure of a reception processing executed by the CPU of the shelf label server which received the second image file.

After receiving the second image file 62, the CPU 111 of the shelf label server 11 starts a reception processing of a procedure shown in the flowchart in FIG. 14~FIG. 15. The procedure of the processing is according to the program stored in the ROM 112 or the auxiliary storage device 114. In addition, the content of the processing shown in FIG. 14 and FIG. 15 and described below is just exemplified as an example, and the same effect can be achieved through various processing.

First, the CPU 111 detects the information of the consolidation direction X or Y from the second image file 62 to determine the direction X or Y specified with the detected information (ACT 31). In a case in which the consolidation direction is the X direction, the CPU 111 executes the processing in ACT 32~ACT 45 in FIG. 14, and in a case in which the consolidation direction is the Y direction, the CPU 111 executes the processing in ACT 51~ACT 65 in FIG. 15.

That is, in a case in which the consolidation direction is the X direction, the CPU 111 initializes a shelf number counter i to "0" (ACT 32). Next, the CPU 111 counts up the shelf number counter i by "1" (ACT 33). The CPU 111 determines whether or not the shelf number counter i is greater than a maximum value imax of the shelf number (ACT 34).

As stated above, the shelf number i is a continuous number which starts from "1" and is uniquely assigned to each commodity shelf 30. Thus, the maximum value imax of the shelf number is equal to the total number of the commodity shelves. That is, in a case in which the shelf number counter i is greater than the maximum value imax of the shelf number (YES in ACT 34), it means that the processing following ACT 35 is executed for all the commodity shelf record 52R managed by the commodity shelf database 52.

In a case in which the shelf number counter i is not greater than maximum value imax (NO in ACT 34), that is, there is an unprocessed commodity shelf record 52R, the CPU 111 detects the commodity shelf record 52R having a shelf number equal to the value of the shelf number counter i from the commodity shelf database 52 (ACT 35). Further, the CPU 111 initializes a stage number counter j to "0" (ACT 36). In addition, the processing order of ACT 35 and ACT 36 may be reversed.

Next, the CPU 111 counts up the stage number counter j by "1" (ACT 37). The CPU 111 determines whether or not the stage number counter j is greater than the number of stages J of the commodity shelf record 52R (ACT 38). In a case in which the stage number counter j is not greater than the number of stages J (NO in ACT 38), the CPU 111 acquires the number of compartments Kj contained in the pair of data in which the stage number is equal to the value of the stage number counter j from the commodity shelf record 52R and determines whether or not the number of compartments Kj is equal to or greater than the number of consolidations N of the second image file 62 (ACT 39)

In a case in which the number of compartments Kj is smaller than the number of consolidations N, the electronic shelf label terminals 13 required for displaying the customer-oriented information divided into N (the number of consolidations) parts are not arranged in the horizontal direction on the shelf of a stage having a stage number j. Thus, in a case in which the number of compartments Kj is smaller than the number of consolidations N (NO in ACT 39), the CPU 111 returns to the processing in ACT 37. That is, the CPU 111 further counts up the stage number counter j by "1", and determines whether or not the electronic shelf label terminals 13 the number of which is equal to or greater than the number of consolidations N are arranged in the horizontal direction on the shelf of the next stage.

In a case in which the number of compartments Kj is equal to or greater than the number of consolidations N, the electronic shelf label terminals 13 required for displaying the customer-oriented information divided into N (the number of consolidations) parts are arranged in the horizontal direction on the shelf of a stage having a stage number j. Thus, in a case in which the number of compartments Kj is equal to or greater than the number of consolidations N (YES in ACT 39), the CPU 111 initializes the compartment number counter k and a data number counter d to "0" (ACT 40). Next, the CPU 111 counts up the compartment number counter k by "1" (ACT 41). The CPU 111 counts up the data number counter d by "1" (ACT 42). Then the CPU 111 retrieves the shelf label database 51, and sets divided image data Gd of the second image file 62 as the second image data for the shelf label record 51R of which the shelf section (i, j, k) is consistent with the shelf number counter i, the stage number counter j and the compartment number counter k (ACT 43: determination module). In addition, the processing order of ACT 41 and ACT 42 may be reversed.

Sequentially, the CPU 111 determines whether or not the data number counter d reaches the number of consolidations N (ACT 44). The allocation of the divided image data Gd contained in the second image file 62 to the electronic shelf label terminals 13 is not completed until the data number counter d reaches the number of consolidations N. Thus, in a case in which the data number counter d does not reach the number of consolidations N (NO in ACT 44), the CPU 111 returns to the processing in ACT 41. That is, the CPU 111 counts up each of the compartment number counter k and the data number counter d by "1". Then the CPU 111 sets the divided image data Gd for the shelf label record 51R of which the shelf section (i, j, k) is consistent with the shelf number counter i, the stage number counter j and the compartment number counter k.

In a case in which the data number counter d reaches the number of consolidations N, the allocation of the divided image data Gd contained in the second image file 62 to the electronic shelf label terminals 13 is completed. Thus, in a case in which the data number counter d reaches the number of consolidations N (YES in ACT 44), the CPU 111 returns to the processing in ACT 37. That is, the CPU 111 further counts up the stage number counter j by "1". In this way, the CPU 111 executes the processing in ACT 39~ACT 44 repeatedly until the stage number counter j is greater than the number of stages J.

In a case in which the stage number counter j is greater than the number of stages J (YES in ACT 38), the CPU 111 returns to the processing in ACT 33. That is, the CPU 111 further counts up the shelf number counter i by "1". In this way, the CPU 111 executes the processing following ACT 35 repeatedly until the shelf number counter i is greater than the maximum value imax.

In a case in which the shelf number counter i is greater than the maximum value imax (YES in ACT 34), the CPU 111 executes shelf label communication processing. That is, the CPU 111 sends each shelf label record 51R of the shelf label database 51 to the electronic shelf label terminal 13 identified with the shelf label ID of the corresponding shelf label record 51R (ACT 45: sending module). After the shelf label communication processing is completed, the CPU 111 terminates the reception processing.

In this way, in a case in which the consolidation direction is the X direction, the divided image data G1~GN divided into N parts are set as the second image data for the N electronic shelf label terminals 13 which are arranged side by side in the horizontal direction from the left side in the shelf of the same stage in the commodity shelf 30.

On the other hand, in a case in which the consolidation direction is the Y direction, the CPU 111 initializes the shelf number counter i to "0" (ACT 51). Next, the CPU 111 counts up the shelf number counter i by "1" (ACT 52). The CPU 111 determines whether or not the shelf number counter i is greater than a maximum value imax of the shelf number (ACT 53).

In a case in which the shelf number counter i is not greater than maximum value imax (NO in ACT 53), the CPU 111 detects the commodity shelf record 52R having a shelf number equal to the value of the shelf number counter i from the commodity shelf database 52 (ACT 54). Then the CPU 111 determines whether or not the number of stages J of the commodity shelf record 52R is greater than the number of consolidations N of the second image file 62 (ACT 55). In a case in which the number of stages J is smaller than the number of consolidations N, the electronic shelf label terminals 13 required for displaying the customer-oriented information divided into N (the number of consolidations) parts are not arranged in the vertical direction on the commodity shelf 30 having a shelf number i. Thus, in a case in which the number of stages J is smaller than the number of consolidations N (NO inACT 55), the CPU 111 returns to the processing in ACT 52. That is, the CPU 111 further counts up the shelf number counter i by "1", and determines whether or not the electronic shelf label terminals 13 the number of which is equal to or greater than the number of consolidations N are arranged in the vertical direction on the commodity shelf 30 of the next shelf number.

In a case in which the number of stages J is equal to or greater than the number of consolidations N (YES in ACT 55), the CPU 111 detects a minimum value Kmin of the number of compartments from the pair of data contained in the commodity shelf record 52R (ACT 56). The CPU 111 initializes the compartment number counter k to "0" (ACT 57). In addition, the processing order of ACT 56 and ACT 57 may be reversed.

Next, the CPU 111 counts up the compartment number counter k by "1" (ACT 58). The CPU 111 determines whether or not the compartment number counter k is greater than the minimum number of compartments Kmin (ACT 59).

The electronic shelf label terminals 13 arranged in each stage of the commodity shelf 30 are aligned in the vertical direction at least before the compartment number counter k reaches the minimum number of compartments Kmin. Thus, in a case in which the compartment number counter k is not greater than the minimum number of compartments Kmin (NO in ACT 59), the CPU 111 initializes the stage number counter j and the data number counter d to "0" (ACT 60). Next, the CPU 111 counts up the stage number counter j by "1" (ACT 61). The CPU 111 counts up the data number counter d by "1" (ACT 62). Then the CPU 111 retrieves the shelf label database 51, and sets divided image data Gd of the second image file 62 as the second image data for the shelf label record 51R of which the shelf section (i, j, k) is consistent with the shelf number counter i, the stage number counter j and the compartment number counter k (ACT 63: determination module). In addition, the processing order of ACT 61 and ACT 62 may be reversed.

Sequentially, the CPU 111 determines whether or not the data number counter d reaches the number of consolidations N (ACT 64). The allocation of the divided image data Gd contained in the second image file 62 to the electronic shelf label terminals 13 is not completed until the data number counter d reaches the number of consolidations N. Thus, in a case in which the data number counter d does not reach the number of consolidations N (NO in ACT 64), the CPU 111 returns to the processing in ACT 61. That is, the CPU 111 counts up each of the stage number counter j and the data number counter d by "1". Then the CPU 111 sets the divided image data Gd for the shelf label record 51R of which the shelf section (i, j, k) is consistent with the shelf number counter i, the stage number counter j and the compartment number counter k.

In a case in which the data number counter d reaches the number of consolidations N, the allocation of the divided image data Gd contained in the second image file 62 to the electronic shelf label terminals 13 is completed. Thus, in a case in which the data number counter d reaches the number of consolidations N (YES in ACT 64), the CPU 111 returns to the processing in ACT 58. That is, the CPU 111 further counts up the compartment number counter k by "1". In this way, the CPU 111 executes the processing in ACT 60~ACT 64 repeatedly until the compartment number counter k is greater than the minimum number of compartments Kmin.

In a case in which the compartment number counter k is greater than the minimum number of compartments Kmin (YES in ACT 59), the CPU 111 returns to the processing in ACT 52. That is, the CPU 111 further counts up the shelf number counter by "1". In this way, the CPU 111 executes the processing following ACT 54 repeatedly until the shelf number counter i is greater than the maximum value imax.

In a case in which the shelf number counter i is greater than the maximum value imax (YES in ACT 53), the CPU 111 executes the shelf label communication processing. That is, the CPU 111 sends each shelf label record 51R of the shelf label database 51 to the electronic shelf label terminal 13 identified with the shelf label ID of the corresponding shelf label record 51R (ACT 65: sending module). After the shelf label communication processing is completed, the CPU 111 terminates the reception processing.

In this way, in a case in which the consolidation direction is the Y direction, the divided image data G1~GN divided into N parts are set as the second image data for the N electronic shelf label terminals 13 which are arranged side by side in the vertical direction from the top down in each stage of the commodity shelf 30.

As stated above, in accordance with the present embodiment, the divided image data G1~GN divided into N (the number of consolidations) parts can be automatically set as the second image data for the N electronic shelf label terminals 13 aligned and arranged in the X direction or the Y direction only by inputting the customer-oriented information, which includes the number of consolidations N, the consolidation direction X or Y and the divided image data G1~GN divided into N (the number of consolidations) parts, to the POS server 22. Thus, the setting work of the second image data required for the display of the customer-oriented information with the plurality of electronic shelf label terminals is simplified.

In addition, in the embodiment described above, the display time of the second image is set to nT time, however, it is not limited to this. A time period when the customer-oriented information is displayed on the commodity shelf 30 can be created by displaying the second image simultaneously on the plurality of electronic shelf label terminals 13 as long as the display time is longer than the nT time.

Further, the transfer of the shelf label server 11 is generally carried out in a state in which the programs such as the control program are stored in the ROM. However, the preset invention is not limited to this. The control program and the like transferred separately from a computer device may be written in a writable storage device of the computer device through an operation of a user and the like. The transfer of the control program and the like may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An electronic shelf label system comprising:
    a plurality of electronic shelf label terminals provided for corresponding compartments on a commodity shelf in which commodities are arranged; and
    an electronic shelf label server configured to distribute a start command to the plurality of electronic shelf label terminals via a network,
    wherein each of the plurality of electronic shelf label terminals includes:
        a display;
        a first image storage in which a first image containing the price of a commodity displayed in the compartment of the commodity shelf equipped with a first electronic shelf label terminal of the electronic shelf label terminals is stored;
        a second image storage in which a second image, which is completed when simultaneously displayed on displays of n (n≥2) electronic shelf label terminals including the first electronic shelf label terminal and arranged in one direction, is stored,
        a timer counter configured to count up every predetermined interval and to be reset upon receipt of the start command; and
        a controller configured to repeatedly control the displays based on a count value obtained by the timer counter to display the first image stored in the first image storage for a first length of time corresponding to the predetermined interval and thereafter continuously display the second image stored in the second image storage for at least a second length of a time which is n times greater than the first length of time, where n is the number of electronic shelf label terminals aligned in the one direction.

2. The electronic shelf label system according to claim 1, wherein
    each of the plurality of electronic shelf label terminals further includes a numeric storage for storing a multiple in changeable manner, and
    the controller sets a time obtained by multiplying the first length of time by the multiple stored in the numeric storage as the minimum display time of the second image.

3. The electronic shelf label system according to claim 2, wherein the electronic shelf label server comprises:
    a shelf label position storage configured to store position information of the plurality of electronic shelf label terminals with respect to the commodity shelf,
    a communication interface configured to communicate with the electronic shelf label terminals; and
    a processor,
    wherein the processor determines the allocation of the second image divided into n parts to the n electronic shelf label terminals aligned in one direction, based on the position information of the plurality of electronic shelf label terminals with respect to the commodity shelf stored in the shelf label position storage, and
    distributes via the communication interface the second image to the n electronic shelf label terminals that are aligned in the one direction according to the allocation.

4. The electronic shelf label system according to claim 1, wherein the electronic shelf label server comprises:
    a shelf label position storage configured to store position information of the plurality of electronic shelf label terminals with respect to the commodity shelf;
    a communication interface configured to communicate with the of the plurality of electronic shelf label terminals, and
    a processor,
    wherein the processor determines the allocation of the second image divided into n parts to the n electronic shelf label terminals aligned in one direction, based on the position information of the plurality of electronic shelf label terminals with respect to the commodity shelf stored in the shelf label position storage, and
    distributes via the communication interface the second image to the n electronic shelf label terminals that are aligned in the one direction according to the allocation.

5. An electronic shelf label terminal comprising:
    a radio circuit configured to communicate with an electronic shelf label server via a radio repeater;
    a display;
    a first image storage configured to store a first image containing the price of a commodity arranged in a compartment on a commodity shelf equipped with the electronic shelf label terminal;
    a second image storage configured to store a second image, which is completed when simultaneously displayed on displays of n (n≥2) electronic shelf label terminals including the electronic shelf label terminal and aligned in one direction;
    a timer counter configured to count up every predetermined interval and to be reset when the radio circuit receives a start command from the electronic shelf label server; and
    a controller configured to repeatedly control the displays based on a count value obtained by the timer counter to display the first image stored in the first image storage for a first length of time corresponding to the predetermined interval and thereafter continuously display the second image stored in the second image storage for at least a second length of time which is n times greater than the first length of time, when n is the number of electronic shelf label terminals aligned in the one direction.

6. An electronic shelf label server comprising:
    a communication interface configured to communicate with a plurality of electronic shelf label terminals provided for corresponding compartments on a commodity shelf in which commodities are arranged, each of the plurality of electronic shelf label terminals comprising a display;
    a first image storage in which a first image containing the price of a commodity displayed in the compartment of the commodity shelf equipped with a first electronic shelf label terminal of the electronic shelf label terminals is stored;

a second image storage in which a second image, which is completed when simultaneously displayed on displays of n (n≥2) electronic shelf label terminals including the first electronic shelf label terminal and arranged in one direction, is stored;

a timer counter configured to count up every predetermined interval and to be reset upon receipt of a start command; and a controller configured to repeatedly control the displays based on a count value obtained by the timer counter to display the first image stored in the first image storage for a first length of time corresponding to the predetermined interval and thereafter continuously display the second image stored in the second image storage for at least a second length of time which is n times greater than the first length of time, where n is the number of electronic shelf label terminals aligned in the one direction;

a shelf label position storage configured to store position information of the plurality of electronic shelf label terminals with respect to the commodity shelf; and a processor which implements:

a first process in which the first image containing the price of the commodity arranged on the commodity shelf equipped with the electronic shelf label terminal is distributed to the plurality of electronic shelf label terminals;

a second process in which the allocation of the second image divided into n parts to the n electronic shelf label terminals aligned in one direction is determined, based on the position information of the plurality of electronic shelf label terminals with respect to the commodity shelf stored in the shelf label position storage;

a third process in which the second image is distributed according to the determined allocation to the n electronic shelf label terminals that are aligned in the one direction via the communication interface; and a fourth process in which the start command is distributed to the plurality of electronic shelf label terminals via the communication interface.

7. A control method, including:

storing position information of a plurality of electronic shelf label terminals with respect to a commodity shelf, the plurality of electronic shelf label terminals provided for corresponding compartments on the commodity shelf in which commodities are arranged, each of the plurality of electronic shelf label terminals comprising: a display; a first image storage in which a first image containing the price of a commodity displayed in the compartment of the commodity shelf equipped with a first electronic shelf label terminal of the electronic shelf label terminals is stored; a second image storage in which a second image, which is completed when simultaneously displayed on displays of n (n≥2) electronic shelf label terminals including the first electronic shelf label terminal and arranged in one direction, is stored; a timer counter configured to count up every predetermined interval and to be reset upon receipt of the start command; a controller configured to repeatedly control the displays based on a count value obtained by the timer counter to display the first image stored in the first image storage for a first length of time corresponding to the predetermined interval and thereafter continuously display the second image stored in the second image storage for at least a second length of time which is n times greater than the first length of time, where n is the number of electronic shelf label terminals arranged in the one direction;

distributing the first image containing the price of the commodity arranged on the commodity shelf equipped with the plurality of electronic shelf label terminals to the plurality of electronic shelf label terminals;

determining the allocation of the second image divided into n parts to the n electronic shelf label terminals aligned in one direction, on the basis of the position information of the plurality of electronic shelf label terminals with respect to the commodity shelf;

distributing the second image to the n electronic shelf label terminals aligned in one direction according to the determined allocation; and distributing the start command to the plurality of electronic shelf label terminals.

* * * * *